United States Patent
Kim et al.

(10) Patent No.: US 8,582,062 B2
(45) Date of Patent: Nov. 12, 2013

(54) 2D/3D SWITCHABLE DISPLAY

(75) Inventors: Beom-Shik Kim, Yongin (KR); Hui Nam, Yongin (KR); Chan-Young Park, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 221 days.

(21) Appl. No.: 12/929,693

(22) Filed: Feb. 9, 2011

(65) Prior Publication Data
US 2012/0019733 A1    Jan. 26, 2012

(30) Foreign Application Priority Data
Jul. 20, 2010   (KR) .................. 10-2010-0070094

(51) Int. Cl.
*G02F 1/1333* (2006.01)
(52) U.S. Cl.
USPC ........................................ 349/122
(58) Field of Classification Search
USPC ........................................ 349/122
See application file for complete search history.

(56) References Cited

U.S. PATENT DOCUMENTS

| | | | |
|---|---|---|---|
| 5,880,798 A * | 3/1999 | Walton et al. | 349/99 |
| 6,069,650 A | 5/2000 | Battersby | |
| 2007/0019132 A1 * | 1/2007 | Kim et al. | 349/95 |

FOREIGN PATENT DOCUMENTS

| | | |
|---|---|---|
| KR | 10 2003-0022583 A | 3/2003 |
| KR | 10 2007-0082109 A | 8/2007 |
| KR | 10 2008-0048331 A | 6/2008 |

OTHER PUBLICATIONS

C.W. Chen, et al., "Fast Switching Fresnel Liquid Crystal Lens for Autostereoscopic 2D/3D Display" SID 10 Digest pp. 428-431, May 2010.

* cited by examiner

*Primary Examiner* — Phu Vu
(74) *Attorney, Agent, or Firm* — Lee & Morse, P.C.

(57) ABSTRACT

A 2D/3D switchable display, including a display unit adapted to display an image, and a lens unit on the display unit, wherein the lens unit includes a first lens substrate on the display unit and including a first electrode array including a plurality of first electrodes that are spaced apart from each other, a second lens substrate on the first lens substrate and including a second electrode array including a plurality of second electrodes that are spaced apart from each other, and a liquid crystal layer between the first lens substrate and the second lens substrate.

20 Claims, 9 Drawing Sheets

2D/3D SWITCHABLE DISPLAY

BACKGROUND

1. Field

Embodiments generally relate to a display, and more particularly, to a 2D/3D switchable display capable of selectively displaying 2D and 3D images.

2. Description of the Related Art

Recently, 3D displays are being applied to various fields such as medicine, games, advertisement, education, military, etc., and a holography or stereoscopy scheme has been prevalently studied as a scheme to display 3D images.

SUMMARY

It is a feature of an embodiment to provide a provide a 2D/3D switchable display having advantages of minimizing deterioration in resolution while displaying 2D/3D images.

It is a separate feature of an embodiment to provide a 2D/3D switchable display adapted to minimize deterioration in resolution while displaying the 2D/3D images.

At least one of the above and other features and advantages may be realized by providing a 2D/3D switchable display, including a display unit adapted to display an image, a lens unit on the display unit, wherein the lens unit includes, a first lens substrate on the display unit and including a first electrode array including a plurality of first electrodes that are spaced apart from each other, a second lens substrate on the first lens substrate and including a second electrode array including a plurality of second electrodes that are spaced apart from each other, and a liquid crystal layer between the first lens substrate and the second lens substrate.

GMLRespective ones of the plurality of first electrodes and the plurality of second electrodes may overlap each other, and the liquid crystal layer may be interposed between the plurality of first electrodes and the plurality of second electrodes.

A first voltage may be applied to the plurality of second electrodes, and the plurality of first electrodes include a first sub electrode to which a second voltage larger than the first voltage is applied, a second sub electrode that is adjacent to the first substrate electrode and to which the first voltage is selectively applied, and a third sub electrode spaced apart from the first sub substrate with the second sub electrode interposed therebetween and to which the second voltage is applied.

The first voltage may be applied to the plurality of second electrodes, and the plurality of first electrodes may include a first sub electrode to which one of a first voltage and a second voltage is selectively applied, the second voltage being larger than the first voltage, a second sub electrode that is adjacent to the first sub electrode, and to which the first voltage is applied when the second voltage is applied to the first sub electrode and to which the second voltage is applied when the first voltage is applied to the first sub electrode, and a third sub electrode that is spaced from the first sub electrode, the second sub electrode being interposed between the first sub electrode and the third sub electrode, the third sub electrode being applied with the same voltage as the first sub electrode.

The display unit may be adapted to display one image selected from left-eye and right-eye images at a position corresponding to the first sub electrode when the second voltage is applied to the first sub electrode, and may display another image selected from left-eye and right-eye images at the position corresponding to the first sub electrode when the first voltage is applied to the first sub electrode.

The display unit may be adapted to display a black image between the one selected image and the another selected image when displaying the another selected image after the one selected image of the left-eye and right-eye images.

Each of the plurality of first electrodes and the plurality of second electrodes may extend in a first direction, and the lens unit further includes an alignment layer that is positioned on at least one of the first electrode array and the second electrode array and is rubbed in a second direction perpendicular to the first direction.

The display unit may include a plurality of pixels that extend in a third direction parallel to the first direction.

The display unit may include a plurality of pixels that extend in a fourth direction crossing the first direction.

A crossing angle between the first direction and the fourth direction is in the range of about and including arctan ⅛ to about and including arctan ⅙.

A crossing angle between the first direction and the fourth direction is arctan ⅙.

The display unit may be an organic light emitting diode (OLED) display.

The display unit may be a liquid crystal display (LCD).

At least one of the above and other features and advantages may be realized by providing a 2D/3D switchable display, including a display unit adapted to display an image, and a lens unit on the display unit, wherein the lens unit includes a first lens substrate on the display unit and including a first electrode array including at least first, second, and third sub electrodes that are spaced apart from each other, the second sub electrode being interposed between the first sub electrode and the third sub electrode, a second lens substrate on the first lens substrate and including a second electrode array including a plurality of second electrodes that are spaced apart from each other, and a liquid crystal layer between the first lens substrate and the second lens substrate, and wherein a first voltage is applied to the second sub electrode, and a second voltage is applied to the first and third sub electrodes, so as to control a lens arrangement of the liquid crystal layer between the first electrode array and the second electrode array, the first voltage being different from the second voltage.

The display unit may be adapted to display a left-eye image or a right-eye image at a same position of the display unit at a first time and a second time, respectively by controlling an electric field generated between the first, second, and third sub electrodes and the second electrode array.

For each unit pixel, when the left-eye image corresponding to a first image or a right-eye image corresponding to a second image overlap, a black image may be displayed.

The display unit may be an organic light emitting diode (OLED) display.

The display unit may be a liquid crystal display (LCD).

Respective ones of the plurality of first electrodes and the plurality of second electrodes overlap each other, and the liquid crystal layer is interposed between the plurality of first electrodes and the plurality of second electrodes.

According to the exemplary embodiments, it can provide the 2D/3D switchable display to minimize deterioration in resolution while displaying the 2D/3D images.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
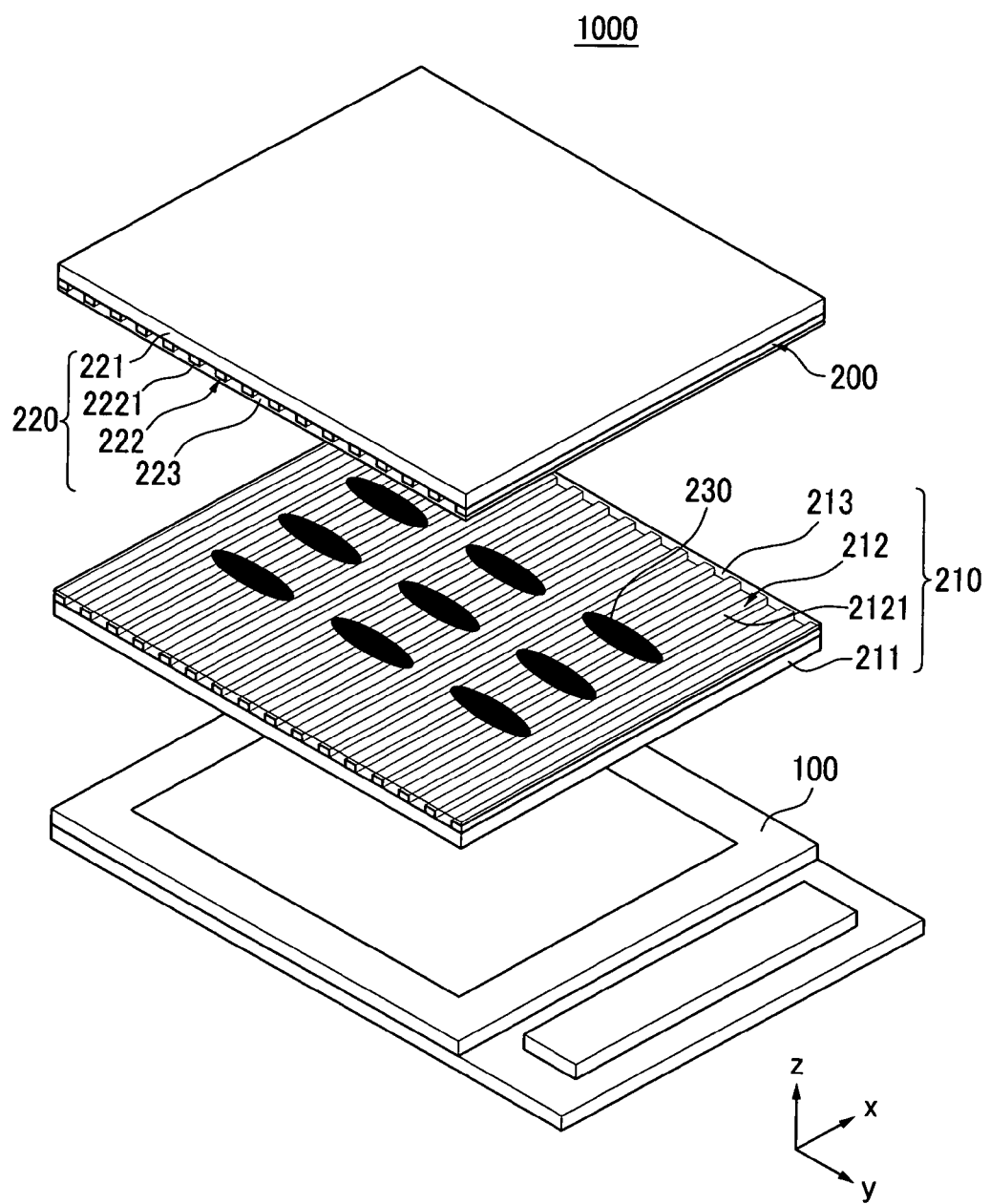
FIG. 1 illustrates a perspective view showing a display according to an exemplary embodiment.

Korean Patent Application No. 10-2010-0070094, filed on Jul. 20, 2010, in the Korean Intellectual Property Office, and entitled: "2D/3D Switchable Display," is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on," "above", "below," or "under" another element, it can be directly "on," "above", "below," or "under" the other element, respectively, or intervening elements may also be present. In addition, it will also be understood that when an element is referred to as being "between" two elements, it can be the only element between the two elements, or one or more intervening elements may also be present.

It will be also be understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. Like reference numerals refer to like elements throughout the specification.

Hereinafter, referring to FIGS. 1 to 8, a display 1000 according to an exemplary embodiment will be described. Hereinafter, the display represents a 2D/3D switchable display that may selectively display a 2D image and/or a 3D image.

FIG. 1 illustrates a perspective view of the display 1000. Referring to FIG. 1, the display 1000 may selectively display 2D images and/or 3D images. The display 1000 may include a display unit 100 and a lens unit 200.

The display unit 100 may display an image. More specifically, to enable a user to recognize a 3D image, the display unit 100 may display a first image, e.g., a left-eye image, and a second image, e.g., a right-eye image. To enable a user to recognize a 2D image, the display unit 100 may selectively display a combined image, e.g., a both-eye image.

The display unit 100 may be, e.g., an organic light emitting diode (OLED) display or a liquid crystal display (LCD). When the display unit 100 is an LCD, the display unit 100 may include a display panel and a backlight unit for irradiating light to the display panel. The display panel may include a plurality of substrates, e.g., two substrates, and liquid crystals positioned between such opposing substrates. Each of the substrates may include a substrate body including, e.g., glass, plastic, metal, etc., and a metal pattern on the substrate body. Such a metal pattern may be used as an electrode and/or a color filter. A longitudinal or transverse electric field may be formed in a space between both substrates, such that a liquid crystal layer may serve as a shutter in accordance with the longitudinal or transverse electric field. Therefore, the display unit 100 may selectively display the 2D image or the 3D image.

When the display unit 100 is the organic light emitting diode display, the display unit 100 may include a plurality of substrates, e.g., two substrates, and an organic light emitting diode positioned between opposing ones of the substrates. Organic light emitting diode displays may be self-emitting displays and may include self-light emitting diodes such that an organic emission layer included in the organic light emitting diode may emit light to selectively display the 2D image or the 3D image.

Figure 2:
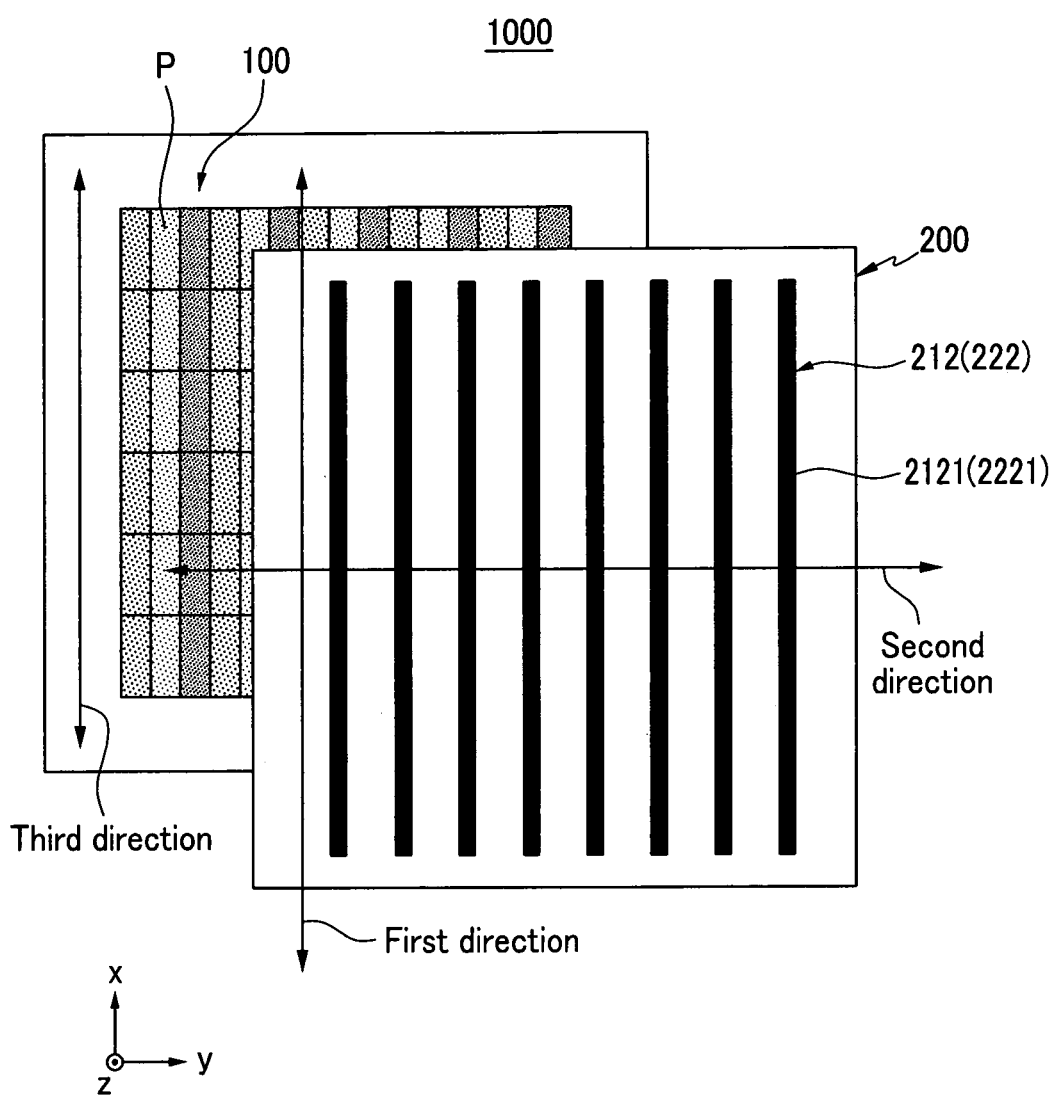
FIG. 2 illustrates a cross-sectional view of portions of the display of FIG. 1 along x-y directions.

FIG. 2 illustrates a cross-sectional view of portions of the display 1000 of FIG. 1 along x-y directions.

Referring to FIGS. 1 and 2, the lens unit 200 may have a refractivity that selectively varies. The lens unit 200 may include a first lens substrate 210, a second lens substrate 220, and a liquid crystal layer 230.

The first lens substrate 210 may include a first substrate body 211, a first electrode array 212, and a first alignment layer 213.

The first substrate body 211 may be a transparent substrate. The first substrate body 211 may include glass, plastic, etc.

The first electrode array 212 may be formed on the first substrate body 211. The first electrode array 212 may include a plurality of first electrodes 2121. The plurality of first electrodes 2121 may be spaced apart from each other on a surface of the first substrate body 211. The first electrode array 212 may include a transparent conductive material, e.g., indium tin oxide (ITO), indium zinc oxide (IZO), etc.

The first alignment layer 213 may be arranged to cover the first electrode array 212. The first alignment layer 213 may be rubbed corresponding to an alignment of the liquid crystal layer 230. An exemplary arrangement of the first electrode array 212 and a rubbing direction of the first alignment layer 213 will be described below.

The second lens substrate 220 may include a second substrate body 221, a second electrode array 222, and a second alignment layer 223.

The second substrate body 221 may be a transparent substrate. The second substrate 221 may include, e.g., glass, plastic, etc. The second electrode array 222 may be formed on the second substrate body 221.

The second electrode array 222 may include a plurality of second electrodes 2221. The second electrodes 2221 may be spaced apart from each other on a surface of the second substrate body 221. The second electrode array 222 may be a transparent conductive material, e.g., indium tin oxide (ITO), indium zinc oxide (IZO), etc.

The second alignment layer 223 may cover the second electrode array 222. The second alignment layer 223 may be rubbed corresponding to an alignment of the liquid crystal layer 230. An exemplary arrangement form of the second electrode array 222 and a rubbing direction of the second alignment layer 223 will be described later.

The liquid crystal layer 230 may be positioned between the first lens substrate 210 and the second lens substrate 220. The liquid crystal layer 230 may include liquid crystals. The liquid crystals may be tilted by an electric field that may be formed between the first electrode array 212 and the second electrode array 222 depending on a voltage applied to the first electrode array 212 and the second electrode array 222 so as to be in the form of a lens in the liquid crystal layer 230. When the liquid crystal layer 230 has the lens form, the display unit 100 may display the left-eye image and the right-eye image, and the display 1000 may be capable of displaying a 3D image. When the liquid crystal layer 230 does not have the lens form, the display unit 100 may display the mixed image, e.g., both-eye image, and the display 1000 may be capable of displaying a 2D image. A lens arrangement of the liquid crystal layer 230 and a display arrangement of the display unit 100 resulting from the lens arrangement will be described below.

Figure 3:
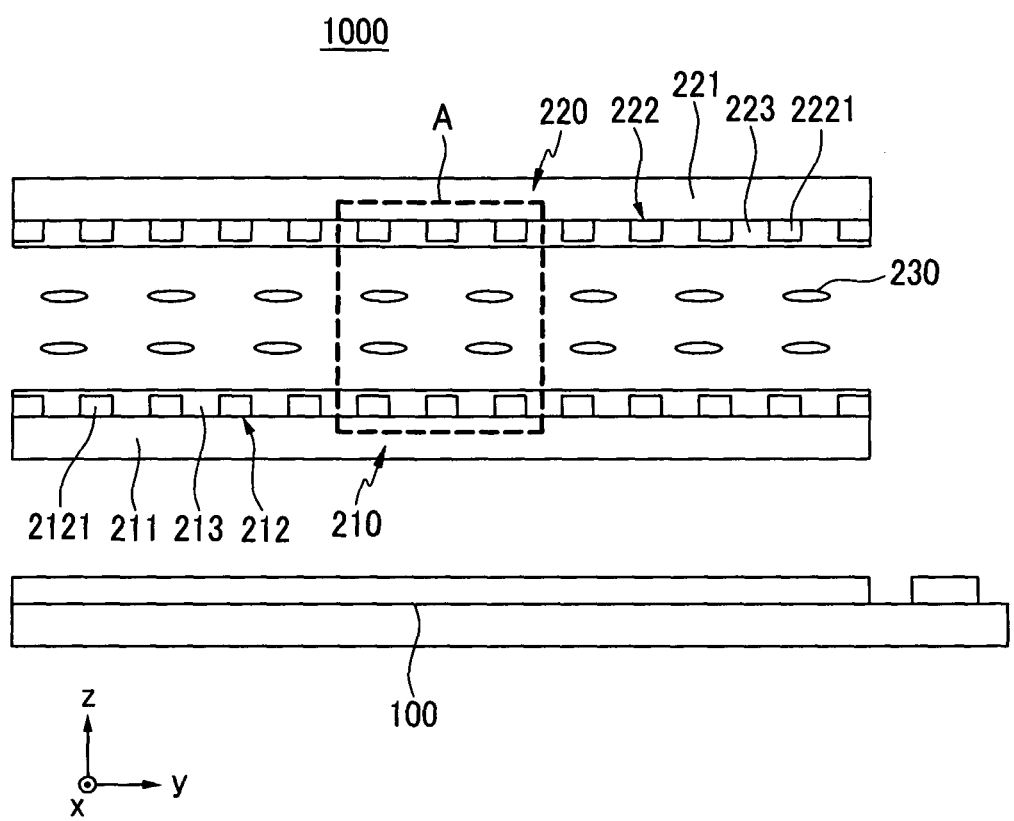
FIG. 3 illustrates a cross-sectional diagram of a portion of the display of FIG. 1 along z-y directions.

FIG. 3 illustrates a cross-sectional diagram of a portion of the display 1000 of FIG. 1 along z-y directions. Referring to FIGS. 1 to 3, exemplary arrangements of the first electrode array 212 and the second electrode array 222 and rubbing directions of the first alignment layer 213 and the second alignment layer 223 will be described.

Referring to FIGS. 1 to 3, the first electrodes 2121 and the second electrodes 2221 may be included in the first electrode array 212 and the second electrode array 222, respectively. The first electrodes 2121 and the second electrodes 2221 may be formed in a stripe pattern and may extend in a first direction. The first direction may correspond to an x-direction. The first electrodes 2121 and the second electrodes 2221 may partially and/or completely overlap each other. The liquid crystal layer 230 may be interposed between the first electrodes 2121 and the second electrodes 2221. Rubbing directions of the first alignment layer 213 and the second alignment layer 223 may extend in a second direction, e.g., y-direction, perpendicular to the first direction, e.g., x-direction. In such embodiments, a pixel P, e.g., a minimum unit of an image displayed by the display unit 100, may extend in a third direction. The third direction may be a same/parallel direction as the first direction, e.g., x-direction.

More particularly, the pixel P may in the third direction, e.g., x-direction, which may be the same/parallel to the direction, e.g., x-direction, in which the first electrodes 2121 and the second electrodes 2221 extend, and the rubbing directions of the first alignment layer 213 and the second alignment layer 223 may extend in the second direction, such that respective portions of the liquid crystal layer 230 between the first electrode array 212 and the second electrode array 222 may be controlled to have a respective lens arrangement by controlling an electric field formed between the first electrode 212 and the second electrode array 222.

Figure 4:
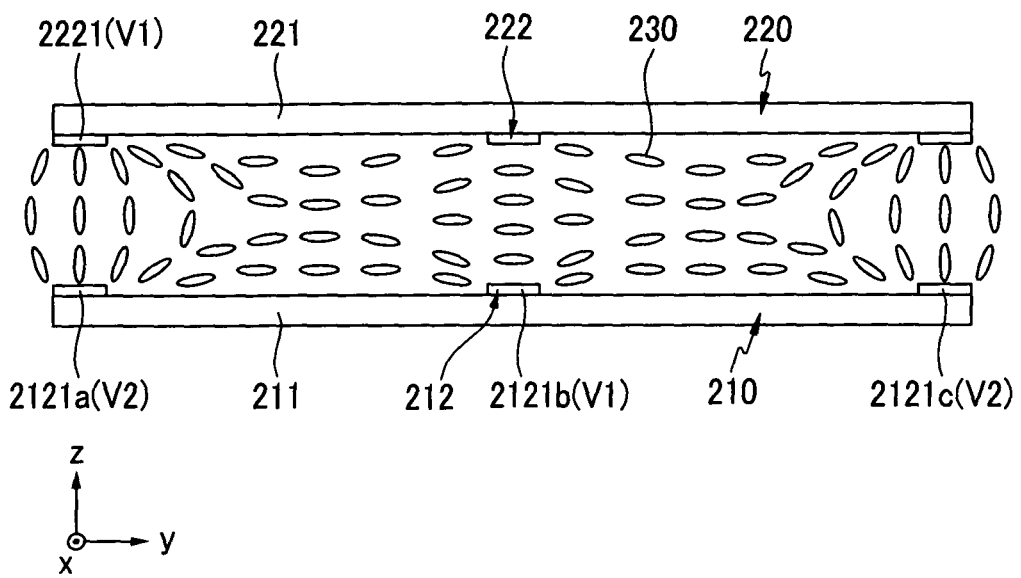
FIGS. 4 and 5 illustrate enlarged views of portion A of FIG. 3.
Figure 5:
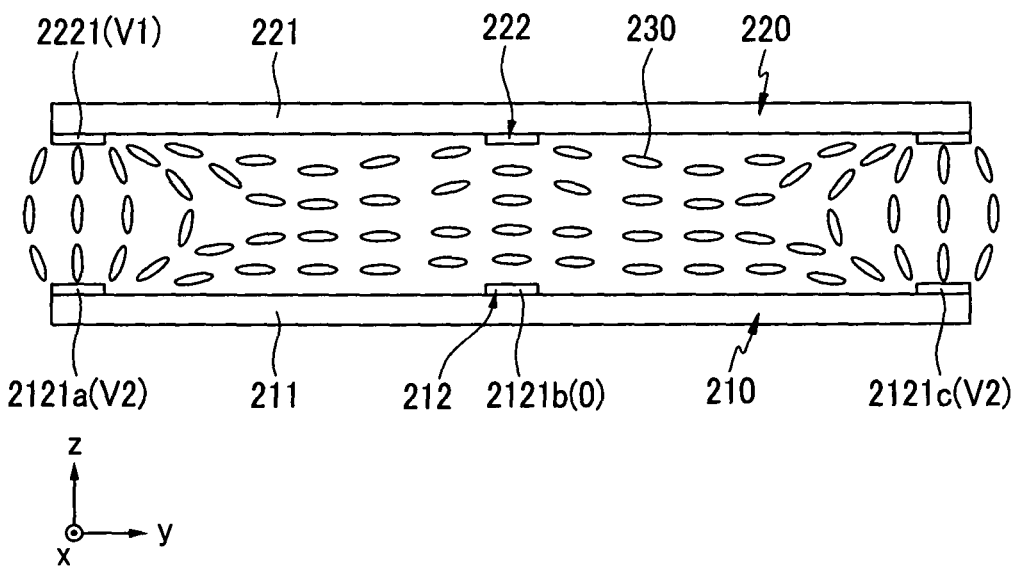

Hereinafter, referring to FIGS. 4 to 6, the lens arrangement of the liquid crystal layer 230 and a display arrangement of the display unit 100 will be described. FIGS. 4 and 5 illustrate enlarged views of portion A of FIG. 3.

First, the lens arrangement of the liquid crystal layer 230 will be described. Referring to FIG. 4, a first voltage V1 may be applied to the plurality of second electrodes 2221 included in the second electrode array 222. A second voltage V2 may be applied to a first sub electrode 2121a and a third sub electrode 2121c among the plurality of first electrodes 2121. The second voltage V2 may be larger than the first voltage V1. The first voltage V1 may be applied to a second sub electrode 2121b adjacent to the first sub electrode 2121a. The third sub electrode 2121c may be spaced apart from the first sub electrode 2121a. The second sub electrode 2121b may be interposed between the first sub electrode 2121a and the third sub electrode 2121c. Under such voltage conditions, the liquid crystal layer 230 may be tilted in accordance with a vertical electric field formed between the first electrode array 212 and the second electrode array 222, corresponding to a lens arrangement shown in FIG. 4.

Further, referring to FIG. 5, the first voltage V1 may be applied to the plurality of second electrodes 2221 included in the second electrode array 222, and the second voltage V2 may be applied to the first sub electrode 2121a and the third sub electrode 2121c among the plurality of first electrodes 2121. The second voltage V2 may be larger than the first voltage V1. A voltage may not be applied to the second sub electrode 2121b. Under such voltage conditions, the liquid crystal layer 230 may be tilted in accordance with the vertical electric field formed between the first electrode array 212 and the second electrode array 222 to form a lens arrangement shown in FIG. 5.

Referring to FIGS. 4 and 5, an arrangement of respective portions of the liquid crystal layer 230 between the first sub electrode 2121a and the third sub electrode 2121c may be minutely controlled by controlling a voltage applied to the second sub electrode 2121b arranged between the first sub electrode 2121a and the third sub electrode 2121c. More particularly, e.g., by applying the first voltage V1 to the second electrode 2122, and the second voltage to the first sub electrode 2121a and the third sub electrode 2121c, respective portions of the liquid crystal layer 230 between the first sub electrode 2121a and the third sub electrode 2121c may be minutely controlled based on a voltage applied to the second sub electrode 2121b.

In embodiments, a lens arrangement of the liquid crystal layer 230 may be minutely controlled by selectively controlling voltages applied to respective ones of the first electrodes 2121 while applying a first voltage V1 to the second electrode 2221.

Next, a display arrangement of the display unit 100 that may be employed together with a lens arrangement of the liquid crystal layer 230 will be described.

Figure 6:
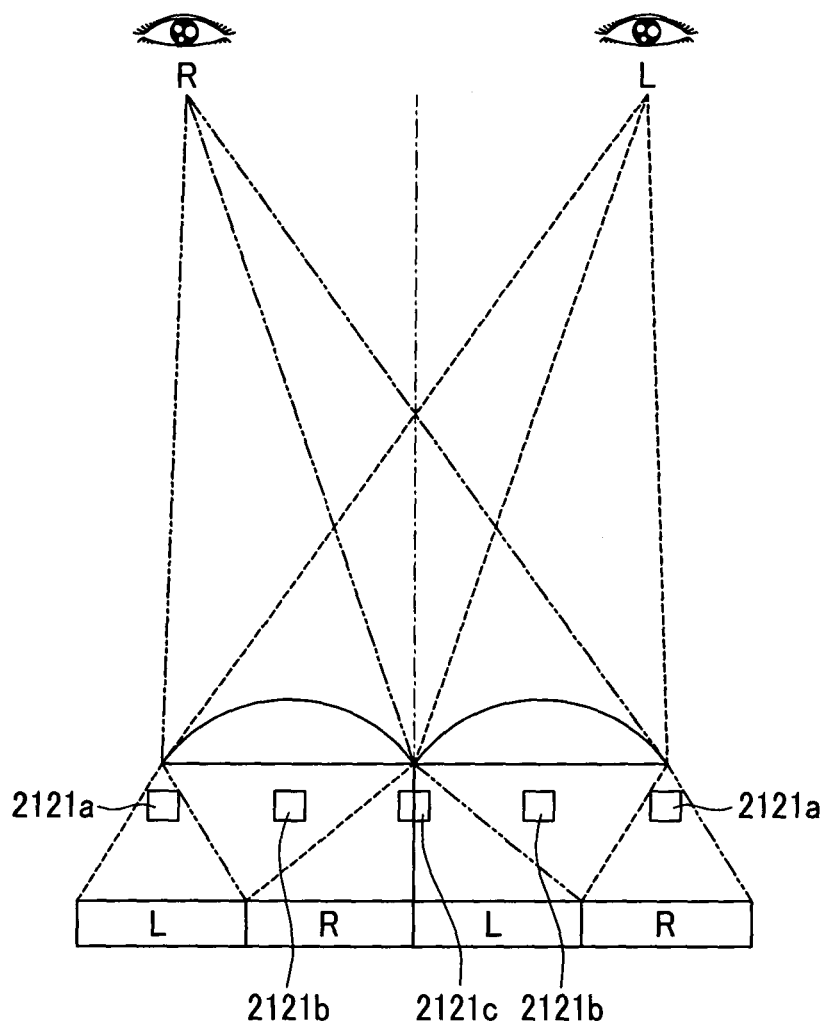
FIG. 6 illustrates a schematic diagram of 3D image recognition with the display of FIG. 1.

FIG. 6 illustrates a schematic diagram of 3D image recognition with the display 1000 of FIG. 1. Referring to FIGS. 1 and 6, when the liquid crystal layer 230 is controlled to be in a lens arrangement, the lens unit 200 may serve as a viewing zone separation unit that separates a left-eye image L and a right-eye image R which may be displayed by the display unit 100 so as to be recognized by a left eye and a right eye, respectively.

More specifically, liquid crystals in respective portions of the liquid crystal layer 230 between, e.g., the first sub electrode 2121a and the third sub electrode 2121c, among the plurality of first electrodes 2121 may be titled based on a vertical electric field formed between the first electrode array 212 and the second electrode array 222, such that the liquid crystal layer 230 may include a plurality of such lens arrangements, e.g., lenses. In such embodiments, when the left-eye image L and the right-eye image R are displayed in the display unit 100 at positions corresponding to each of the plurality of lenses of the liquid crystal layer 230, the left-eye image L may be refracted through the liquid crystal layer 230 to be recognized by a user's left eye and the right-eye image R may be refracted through the liquid crystal layer 230 to be recognized by a user's right eye, such that a user may recognize an image recognized from the display 1000 as the 3D image by binocular disparity.

Meanwhile, when the display unit 100 displays the both-eye image without applying a voltage to the first electrode array 212 and the second electrode array 222 of the lens unit 200, the both-eye image displayed from the display unit 100 may be recognized by both eyes of a user through the lens unit 200 to enable a user to recognize the 2D image from the display 1000.

In embodiments, the first electrode array 212 may include the plurality of first electrodes 2121 and the second electrode array 222 may include the plurality of second electrodes 2221. Intensities of voltages applied to the plurality of first electrodes 2121 may be different from each other, such that a vertical electric field formed between the first electrode 2121 and the second electrode 2221 can be minutely controlled. Therefore, a lens arrangement of respective portions of the liquid crystal layer 230 between the first electrode array 212 and the second electrode array 222 may be minutely controlled. In embodiments, because a refractive degree of an image recognized by a user through the lens unit 200 from the display unit 100 may be controlled by minutely controlling a lens arrangement of the liquid crystal layer 230, the lens arrangement formed by the liquid crystal layer 230 may have an actual lens arrangement.

Figure 7A:
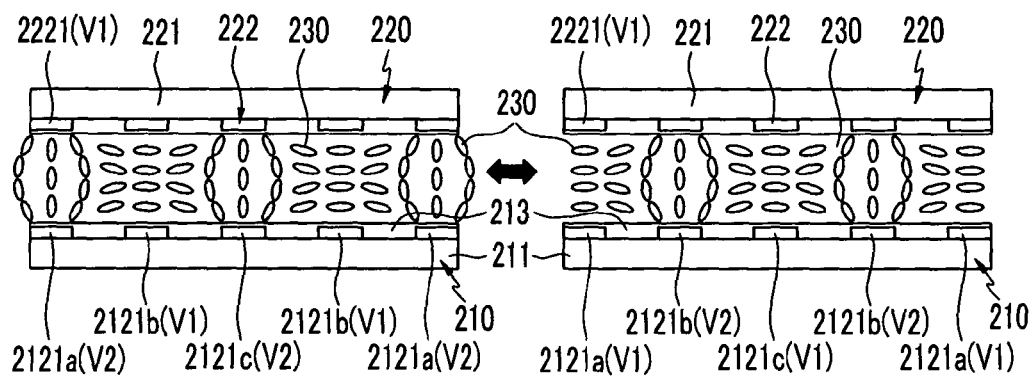
FIGS. 7A and 7B illustrate schematic diagrams of 3D image recognition based on time-division driving in the display of FIG. 1.
Figure 7B:
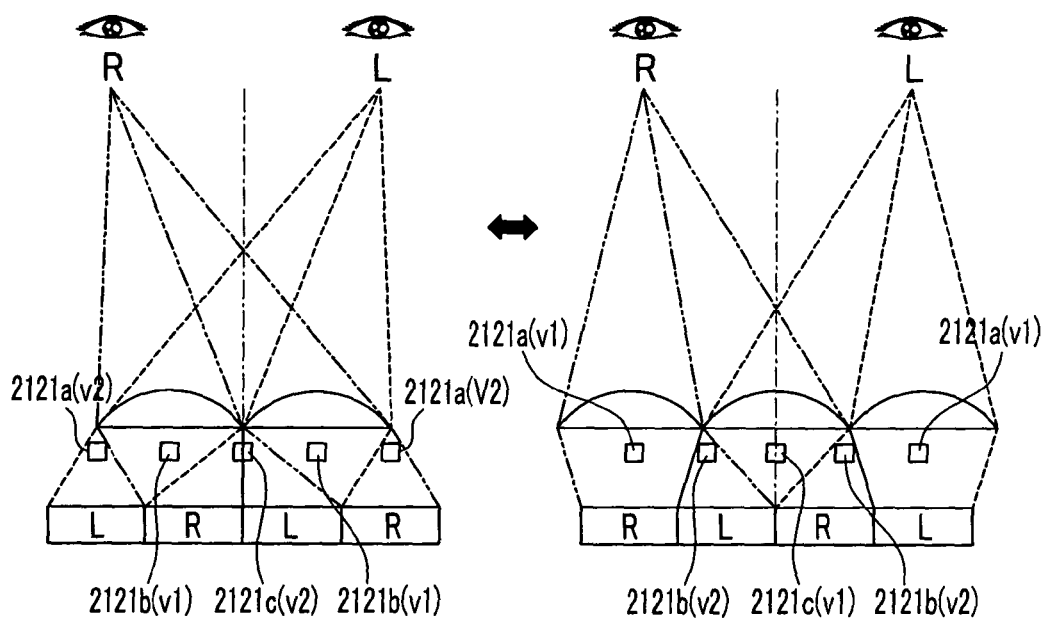
Figure 8:
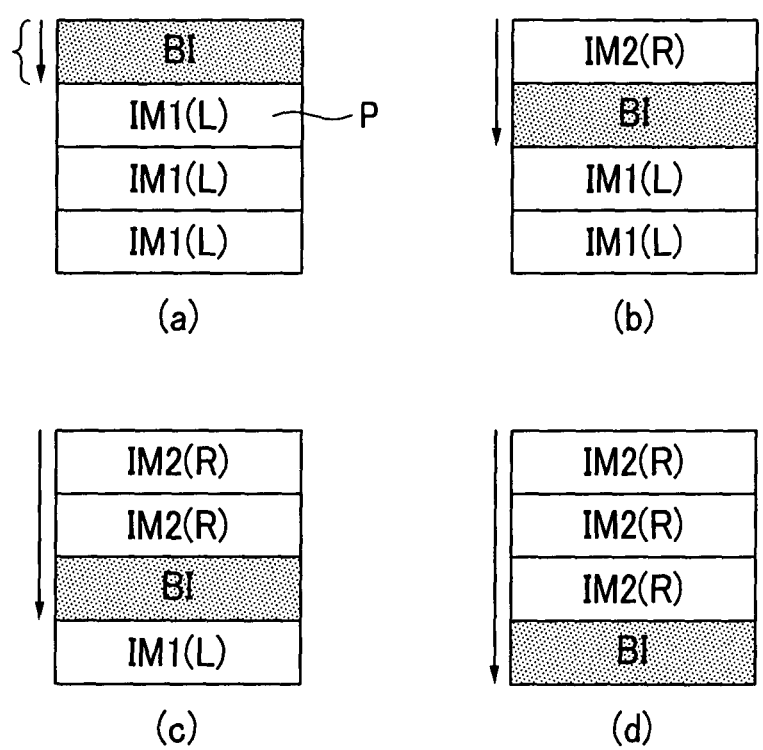
FIGS. 8A, 8B, 8C, and 8D illustrate a block diagram of left, right, and black image states of an intermediate part of the display of FIG. 1 during 3D image recognition based on time-division driving.

FIGS. 7A and 7B illustrate schematic diagrams of 3D image recognition based on time-division driving of the display 1000 of FIG. 1. FIGS. 8A, 8B, 8C, and 8D illustrate a block diagram of left, right, and black image states of an intermediate part of the display 1000 of FIG. 1 during 3D image recognition based on time-division driving.

Referring to FIG. 7A, during a first state, the first voltage V1 may be applied to the plurality of second electrodes 2221 and the second sub electrode 2121b, and the second voltage V2 may be applied to the first sub electrode 2121a and the third sub electrode 2121c, and the liquid crystals of the liquid crystal layer 230 corresponding between the first sub electrode 2121a and the third sub electrode 2121c among the plurality of first electrodes 2121 may be tilted to be in a lens arrangement by the vertical electric field formed between the first electrode array 212 and the second electrode array 222. In such a first state, the display unit 100 may display the left-eye image L at a position corresponding to the first sub electrode 2121a. In the exemplary embodiment of FIG. 7A, the right-eye image R and the other left-eye image L are alternately disposed from the left-eye image L.

Next, as shown in FIG. 7B, in a second state, the first voltage V1 may be applied to the plurality of second electrodes 2221, the first sub electrode 2121a, and the third sub electrode 2121c, and the second voltage V2 may be applied to the second sub electrode 2121b, and the liquid crystals of the liquid crystal layer 230 between the second sub electrodes 2121b may be tilted in a lens arrangement based on the vertical electric field formed between the first electrode array 212 and the second electrode array 222. In such a second state, the display unit 100 may display the right-eye image R at a position corresponding to the first, sub electrode 2121a. In the exemplary embodiment of FIG. 7B, the left-eye image L and the other right-eye image R are alternately disposed from the right-eye image R.

The display 1000 may be driven such that, e.g., the first state and the second states may be repeated.

In embodiments, a lens arrangement of respective portions of the liquid crystal layer 230, of the lens unit 200 may be shifted in accordance with an electric field between the first electrode array 212 and the second electrode array 222. Embodiments may provide the display unit 100 that may alternately display the left-eye image L and the right-eye image R at a same position corresponding to the first sub electrode 2121a, while still enabling a left-eye image L and a right-eye image R to be recognized by user's right and left eyes so as to allow the user to recognize a 3D image.

In embodiments, the display unit 100 may display the left-eye image L or the right-eye image R at the same position depending on a time. Accordingly, embodiments may improve display resolution, and, more particularly, may prevent an overall resolution of the display 1000 from being deteriorated. As an example, in an embodiment in which an image having a scan velocity of 60 Hz is displayed, when the left-eye image L or the right-eye image R is displayed at the same position depending on a time with a scan velocity of 120 Hz, the user recognizes the image having the 60 Hz scan velocity so as to prevent the overall resolution from being deteriorated.

In embodiments, by realizing the display unit 100 as, e.g., the organic light emitting diode display or the liquid crystal display, an entire image is not changed at once, but sequentially. That is, e.g., the first image IM1 and the second image IM2 may be changed in sequence in a scanning direction at the time of displaying the first image IM1 and thereafter, displaying the second image IM2. When the first image IM1 and the second image IM2 are overlapped with each other, the left-eye image L which is the first image IM1 and the right-eye image R which is the second image IM2 may not be separated from each other and may result in crosstalk, thereby deteriorating display quality.

In embodiments, in order to prevent and/or reduce the display quality from being deteriorated, the display 1000 may turn off an image of an intermediate part changed from a first image IM1 corresponding to the left-eye image L to a second image IM2 corresponding to the right-eye image R into a black image BI during time-division driving, as shown in FIGS. 8A to 8D. As a result, a section where the first image IM1 and the second image IM2 are overlapped with each other may be realized to the user as the black image BI, thereby minimizing a crosstalk phenomenon that may occur to the user realizing the 3D image.

Meanwhile, the black image BI may be displayed in one pixel or in a plurality of adjacent pixels. Further, when the display unit 100 is the liquid crystal display, the black image BI may be displayed by turning off a backlight unit corresponding to a position where the black image BI is displayed and when the display unit 100 is the organic light emitting diode display, the black image BI may be displayed by turning off the emission of an organic light emitting diode corresponding to a position where the black image BI is displayed.

As discussed above, 3D displays are being applied to various fields such as medicine, games, advertisement, education, military, etc., and a holography or stereoscopy scheme has been prevalently studied as a scheme to display 3D images. Among others, the stereoscopy scheme is a scheme that separates two 2D images having binocular disparity into left and right eyes of a user, respectively, and sees them, thereby allowing a person to recognize 3D images. Among the stereoscopy schemes, there is also spectacles scheme using polarization and shutter as a unit to see images separated from both eyes and a non-spectacles scheme forming a visual field by directly dividing images from a display. Among others, as an autostereoscopic scheme, there is a parallax barrier scheme and a lenticular lens scheme. The lenticular lens scheme disposes images corresponding to a left eye or a right eye on a focusing surface of a lens and separates images into the left and right eyes of the user according to the directional characteristics of the lenticular lens and recognizes them when the user observes images through the lenticular lens, such that the user recognizes the 3D images. However, the 3D display in the lenticular lens scheme displays only the 3D images but does not display the 2D images. Further, there is a problem in that the 3D display in the lenticular lens scheme separates and displays the images corresponding to the left and right eyes of the user in one display panel according to the directional characteristics of the lenticular lens, such that the entire resolution is deteriorated to ½ times.

Embodiments employing one or more features described herein may at least be advantageous over such known displays. For example, in embodiments, e.g., the display unit 100 may display the left-eye image L or the right-eye image R at the same position at different points in time such that display resolution may not be deteriorated. Further, e.g., in embodiments, a black image may be displayed at intermediate points in time between displaying overlapping left and right eye images so as to reduce and/or prevent cross-talk.

Hereinafter, referring to FIG. 9, a display 1002 according to a second exemplary embodiment and a display 1003 according to a third exemplary embodiment will be described.

Figure 9A:
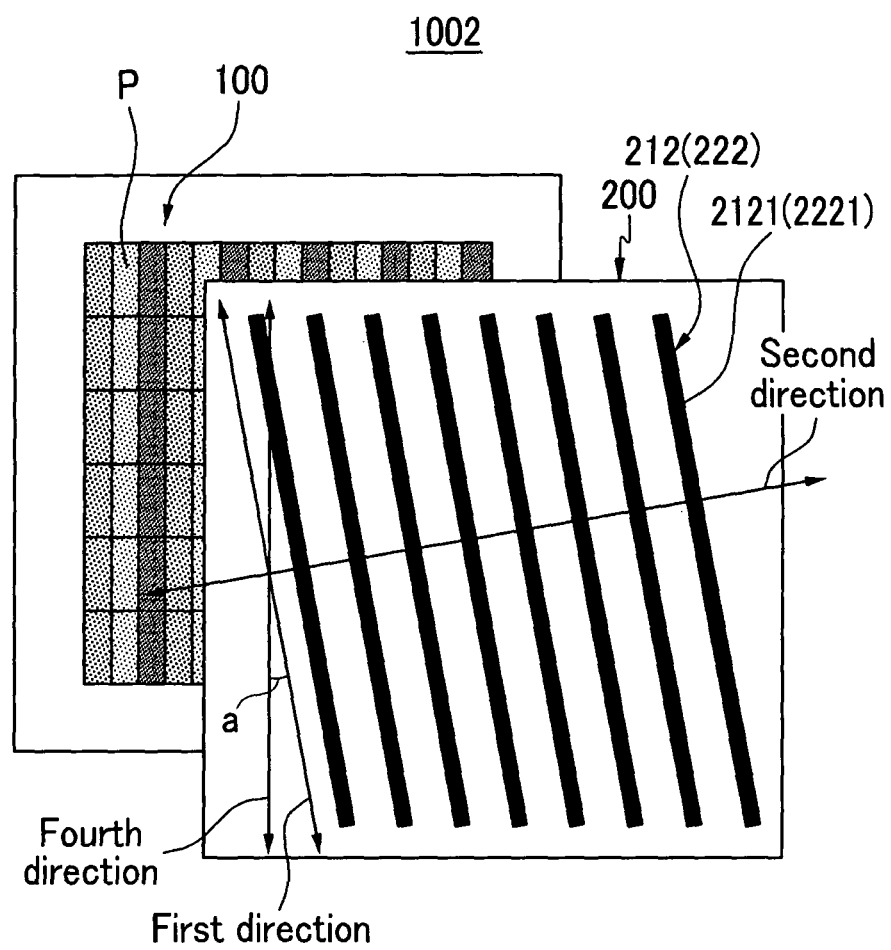
FIGS. 9A and 9B each illustrate cross-sectional views of portions of the display of FIG. 1 along x-y directions according to other exemplary embodiments.
Figure 9B:
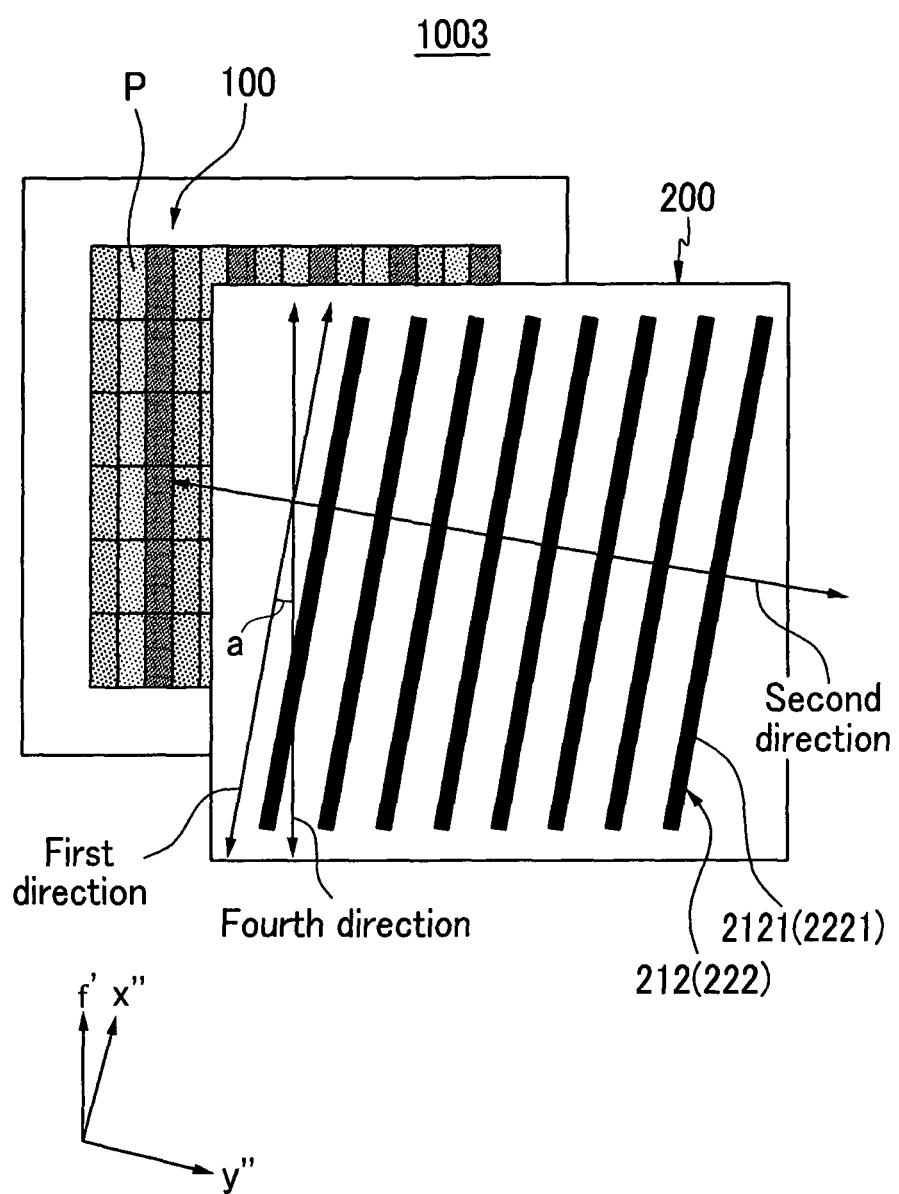

FIGS. 9A and 9B each illustrate cross-sectional views of portions of the display 1000 of FIG. 1 along x-y directions according to other exemplary embodiments. In general, only differences between the exemplary embodiments of FIGS. 9A and 9B and the exemplary embodiment of FIG. 2 will be described below.

Referring to FIG. 9A, in the display 1002, the first electrodes 2121 and the second electrodes 2221 which are included in the first electrode array 212 and the second electrode array 222, respectively, may extend in A first direction, e.g., x'-direction. Rubbing directions of the first alignment layer 213 and the second alignment layer 223 may extend in a second direction, e.g., y'-direction, perpendicular to the first direction. The pixel P which is the minimum unit of the image displayed by the display unit 100 extends in a fourth direction, e.g., f-direction, that crosses the first direction. In embodiments, a crossing angle α at which the first direction and the fourth direction cross each other may be, e.g., arctan ⅙.

In the display 1002, the pixel P, e.g., minimum unit of the image displayed by the display unit 100, extends in the fourth direction, the first electrode 2121 and the second electrode 2221 extend in the first direction crossing the fourth direction and the rubbing directions of the first alignment layer 213 and the second alignment layer 223 extend in the second direction, and the liquid crystal layer 230 positioned between the first electrode array 212 and the second electrode array 222 may be controlled so as to have a lens arrangement similar to an actual lens based on an electric field formed between the first electrode array 212 and the second electrode array 222.

Referring to FIG. 9B, in the display 1003, the first electrode 2121 and the second electrode 2221, which may be included in the first electrode array 212 and the second electrode array 222, respectively, may extend in a first direction, e.g., x"-direction, the rubbing directions of the first alignment layer 213 and the second alignment layer 223 extend in a second direction, e.g., y"-direction, that is perpendicular to the first direction, and the pixel P, e.g., minimum unit of the image displayed by the display unit 100, may extend in a fourth direction, e.g., f'-direction, crossing the first direction, e.g., x"-direction. In such embodiments, a crossing angle b at which the first direction, e.g., x"-direction, and the fourth direction, e.g., f'-direction, cross each other is arctan ⅙.

As such, in the display 1003, when the pixel P extends in the fourth direction, the first electrode 2121 and the second electrode 2221 extend in the first direction crossing the fourth direction and the rubbing directions of the first alignment layer 213 and the second alignment layer 223 extend in the second direction, and the liquid crystal layer 230 positioned between the first electrode array 212 and the second electrode array 222 controlled so as to have a lens arrangement similar to an actual lens based on an electric field formed between the first electrode array 212 and the second electrode array 222.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A 2D/3D switchable display, comprising:
a display unit adapted to display an image; and
a lens unit on the display unit,
wherein the lens unit includes:
a first lens substrate on the display unit and including a first electrode array including a plurality of first electrodes that are spaced apart from each other,
a second lens substrate on the first lens substrate and including a second electrode array including a plurality of second electrodes that are spaced apart from each other, and
a liquid crystal layer between the first lens substrate and the second lens substrate,
wherein the lens unit is configured to apply two different voltages to the plurality of first electrodes within the first electrode array, and to apply a same voltage to the plurality of second electrodes within the second electrode array, the voltage applied to the second electrode array being equal to one of the two different voltages applied to the first electrode array.

2. The 2D/3D switchable display as claimed in claim 1, wherein:
respective ones of the plurality of first electrodes and the plurality of second electrodes overlap each other, and the liquid crystal layer is interposed between the plurality of first electrodes and the plurality of second electrodes.

3. The 2D/3D switchable display as claimed in claim 2, wherein:
a first voltage is applied to the plurality of second electrodes, and
the plurality of first electrodes include:
a first sub electrode to which a second voltage larger than the first voltage is applied;
a second sub electrode that is adjacent to the first substrate electrode and to which the first voltage is selectively applied; and
a third sub electrode spaced apart from the first sub substrate with the second sub electrode interposed therebetween and to which the second voltage is applied.

4. The 2D/3D switchable display as claimed in claim 2, wherein:
the first voltage is applied to the plurality of second electrodes, and
the plurality of first electrodes include,
a first sub electrode to which one of a first voltage and a second voltage is selectively applied, the second voltage being larger than the first voltage;
a second sub electrode that is adjacent to the first sub electrode, and to which the first voltage is applied when the second voltage is applied to the first sub electrode and to which the second voltage is applied when the first voltage is applied to the first sub electrode; and a third sub electrode that is spaced from the first sub electrode, the second sub electrode being interposed between the first sub electrode and the third sub electrode, the third sub electrode being applied with the same voltage as the first sub electrode.

5. The 2D/3D switchable display as claimed in claim 4, wherein the display unit is adapted to:

display one image selected from left-eye and right-eye images at a position corresponding to the first sub electrode when the second voltage is applied to the first sub electrode, and display another image selected from left-eye and right-eye images at the position corresponding to the first sub electrode when the first voltage is applied to the first sub electrode.

6. The 2D/3D switchable display as claimed in claim 5, wherein the display unit is adapted to display a black image between the one selected image and the another selected image when displaying the another selected image after the one selected image of the left-eye and right-eye images.

7. The 2D/3D switchable display as claimed in claim 1, wherein:

each of the plurality of first electrodes and the plurality of second electrodes extends in a first direction, and the lens unit further includes an alignment layer that is positioned on at least one of the first electrode array and the second electrode array and is rubbed in a second direction perpendicular to the first direction.

8. The 2D/3D switchable display as claimed in claim 7, wherein:

the display unit includes a plurality of pixels that extend in a third direction parallel to the first direction.

9. The 2D/3D switchable display as claimed in claim 7, wherein:

the display unit includes a plurality of pixels which extend in a fourth direction crossing the first direction.

10. The 2D/3D switchable display as claimed in claim 9, wherein:

a crossing angle between the first direction and the fourth direction is in the range of about and including arctan ⅕ to about and including arctan ⅙.

11. The 2D/3D switchable display as claimed in claim 9, wherein:

a crossing angle between the first direction and the fourth direction is arctan ⅙.

12. The 2D/3D switchable display as claimed in claim 1, wherein the display unit is an organic light emitting diode (OLED) display.

13. The 2D/3D switchable display as claimed in claim 1, wherein the display unit is a liquid crystal display (LCD).

14. A 2D/3D switchable display, comprising:

a display unit adapted to display an image; and a lens unit on the display unit, wherein the lens unit includes:

a first lens substrate on the display unit and including a first electrode array including at least first, second, and third sub electrodes that are spaced apart from each other, the second sub electrode being interposed between the first sub electrode and the third sub electrode, a second lens substrate on the first lens substrate and including a second electrode array including a plurality of second electrodes that are spaced apart from each other, a liquid crystal layer between the first lens substrate and the second lens substrate, and a voltage source configured to apply a first voltage to the second sub electrode and a second voltage to the first and third sub electrodes, the first voltage being different from the second voltage.

15. The 2D/3D switchable display as claimed in claim 14, wherein the display unit is configured to control an electric field between the second electrode array and each of the first, second, and third sub electrodes, and to display a left-eye image or a right-eye image at a same position of the display unit at a first time and a second time, respectively.

16. The 2D/3D switchable display as claimed in claim 15, wherein for each unit pixel, when the left-eye image corresponding to a first image or a right-eye image corresponding to a second image overlap, a black image may be displayed.

17. The 2D/3D switchable display as claimed in claim 15, wherein the display unit is an organic light emitting diode (OLED) display.

18. The 2D/3D switchable display as claimed in claim 15, wherein the display unit is a liquid crystal display (LCD).

19. The 2D/3D switchable display as claimed in claim 1, wherein the first lens substrate of the lens unit is directly on the display unit.

20. The 2D/3D switchable display as claimed in claim 1, wherein the plurality of first electrodes within the first electrode array are connected to different voltage sources, the plurality of second electrodes within the second electrode array are all being connected to a same voltage source.

* * * * *